US011717112B2

(12) United States Patent
Brown

(10) Patent No.: US 11,717,112 B2
(45) Date of Patent: Aug. 8, 2023

(54) MODULAR FOOD DISPENSING DEVICE

(71) Applicant: Firmenich SA, Geneva (CH)

(72) Inventor: Edward J Brown, Leicestershire (GB)

(73) Assignee: Firmenich SA, Satigny (CH)

( * ) Notice: Subject to any disclaimer, the term of this patent is extended or adjusted under 35 U.S.C. 154(b) by 976 days.

(21) Appl. No.: 16/088,537

(22) PCT Filed: Apr. 6, 2017

(86) PCT No.: PCT/EP2017/058184
§ 371 (c)(1),
(2) Date: Sep. 26, 2018

(87) PCT Pub. No.: WO2017/174697
PCT Pub. Date: Oct. 12, 2017

(65) Prior Publication Data
US 2021/0106178 A1  Apr. 15, 2021

Related U.S. Application Data

(60) Provisional application No. 62/319,576, filed on Apr. 7, 2016.

(30) Foreign Application Priority Data

Apr. 20, 2016 (EP) ...................................... 1606903

(51) Int. Cl.
*A47J 42/40* (2006.01)
*A47J 42/46* (2006.01)

(52) U.S. Cl.
CPC ............... *A47J 42/40* (2013.01); *A47J 42/46* (2013.01)

(58) Field of Classification Search
CPC ............. A47J 42/40; A47J 42/46; A47J 42/50
(Continued)

(56) References Cited

U.S. PATENT DOCUMENTS 2,876,956 A * 3/1959 Bentley ................... A47J 42/34
241/168
3,096,036 A * 7/1963 Cowles ................... A47J 42/34
241/169

(Continued)

FOREIGN PATENT DOCUMENTS

DE  20215609 U1  1/2003
EP   1466548 A1  10/2004
(Continued)

OTHER PUBLICATIONS

International Search Report for PCT Application No. PCT/EP2017/058184, dated Aug. 14, 2017.

*Primary Examiner* — Lien M Ngo
(74) *Attorney, Agent, or Firm* — Robert S. Dailey

(57) ABSTRACT

A modular food dispensing device comprising a food container configured to contain and dispense a food product, a drive module for mechanically driving the food container to dispense the food product, and one or more magnets provided on one or both of the food container and drive module for releasably connecting the food container and drive module. The drive module is releasably connectable to the food container to selectively form a mechanical linkage for transmitting a driving force from the drive module to the food container to dispense the food product.

14 Claims, 8 Drawing Sheets

(58) Field of Classification Search
USPC .......... 222/410–414; 241/168, 169.1
See application file for complete search history.

(56) References Cited

U.S. PATENT DOCUMENTS

| | | | | |
|---|---|---|---|---|
| 4,685,627 | A * | 8/1987 | Lee | A47J 42/04 241/261.1 |
| 6,851,635 | B2 * | 2/2005 | McCowin | A47J 42/10 241/169.1 |
| 7,673,828 | B1 * | 3/2010 | Fang | A47J 42/04 241/168 |
| 7,874,505 | B1 * | 1/2011 | Lassota | B02C 7/14 241/36 |
| 2004/0123747 | A1 * | 7/2004 | Lassota | A47J 31/42 99/510 |
| 2005/0133644 | A1 | 6/2005 | Wu | |
| 2006/0076442 | A1 * | 4/2006 | Fouse | A47J 42/34 241/169.1 |
| 2010/0200685 | A1 * | 8/2010 | Fang | A47J 42/40 241/169.1 |
| 2013/0193246 | A1 | 8/2013 | Roberts, Jr. | |
| 2015/0297033 | A1 * | 10/2015 | Wong | A47J 42/50 241/101.3 |

FOREIGN PATENT DOCUMENTS

| | | |
|---|---|---|
| EP | 2193734 A1 | 6/2010 |
| GB | 2393671 B | 8/2005 |
| WO | 2014207192 A1 | 12/2014 |

* cited by examiner

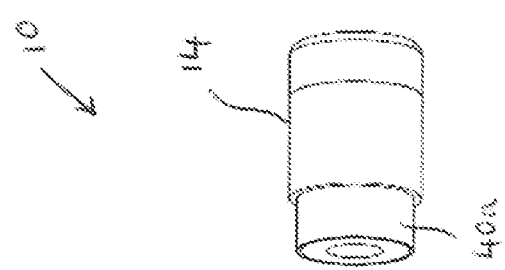
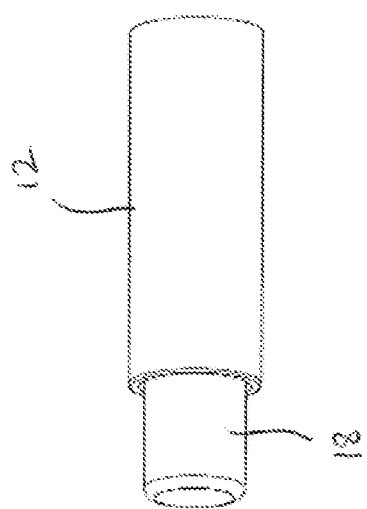
Figure 1

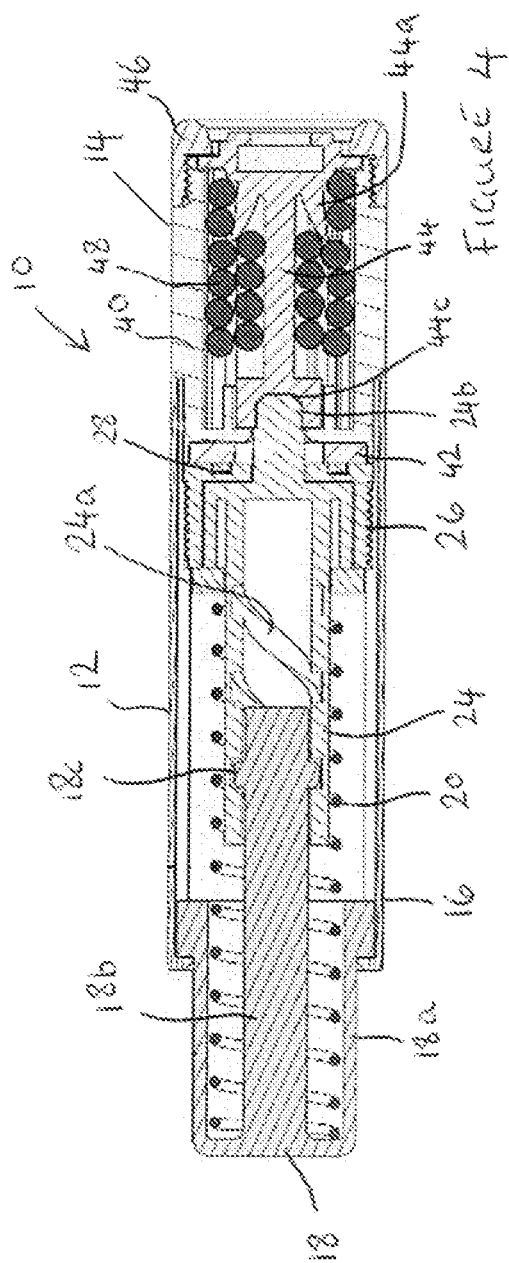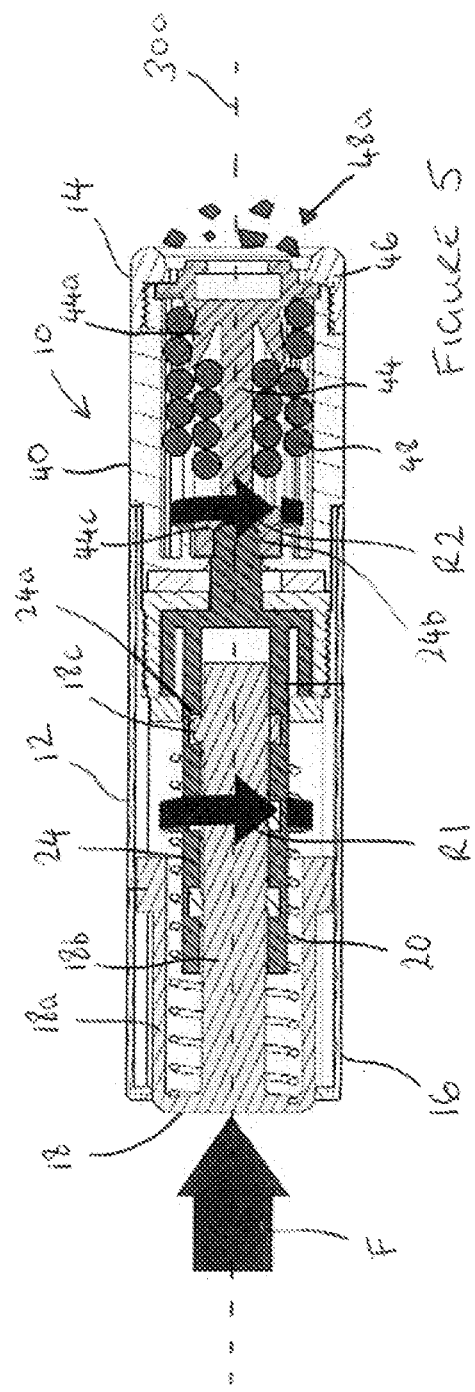

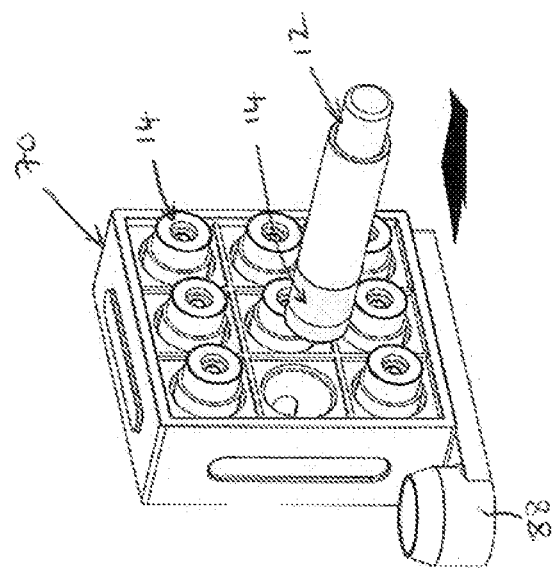
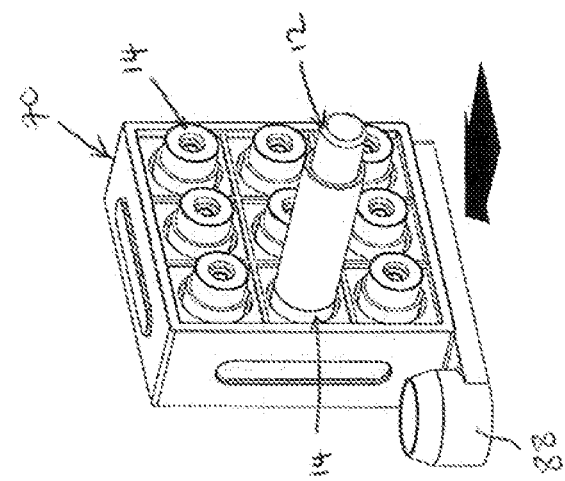
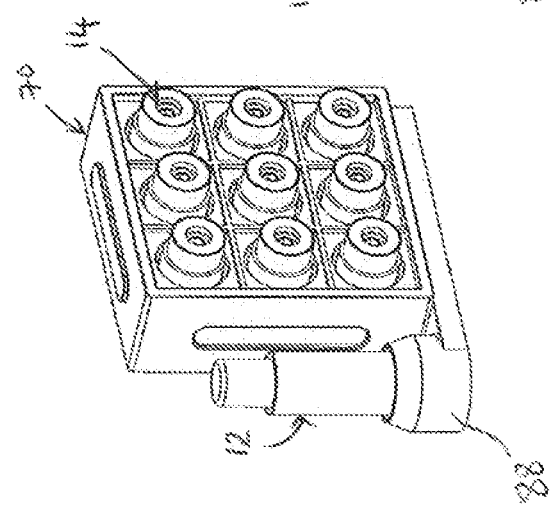
FIGURE 7C
FIGURE 7B
FIGURE 7A

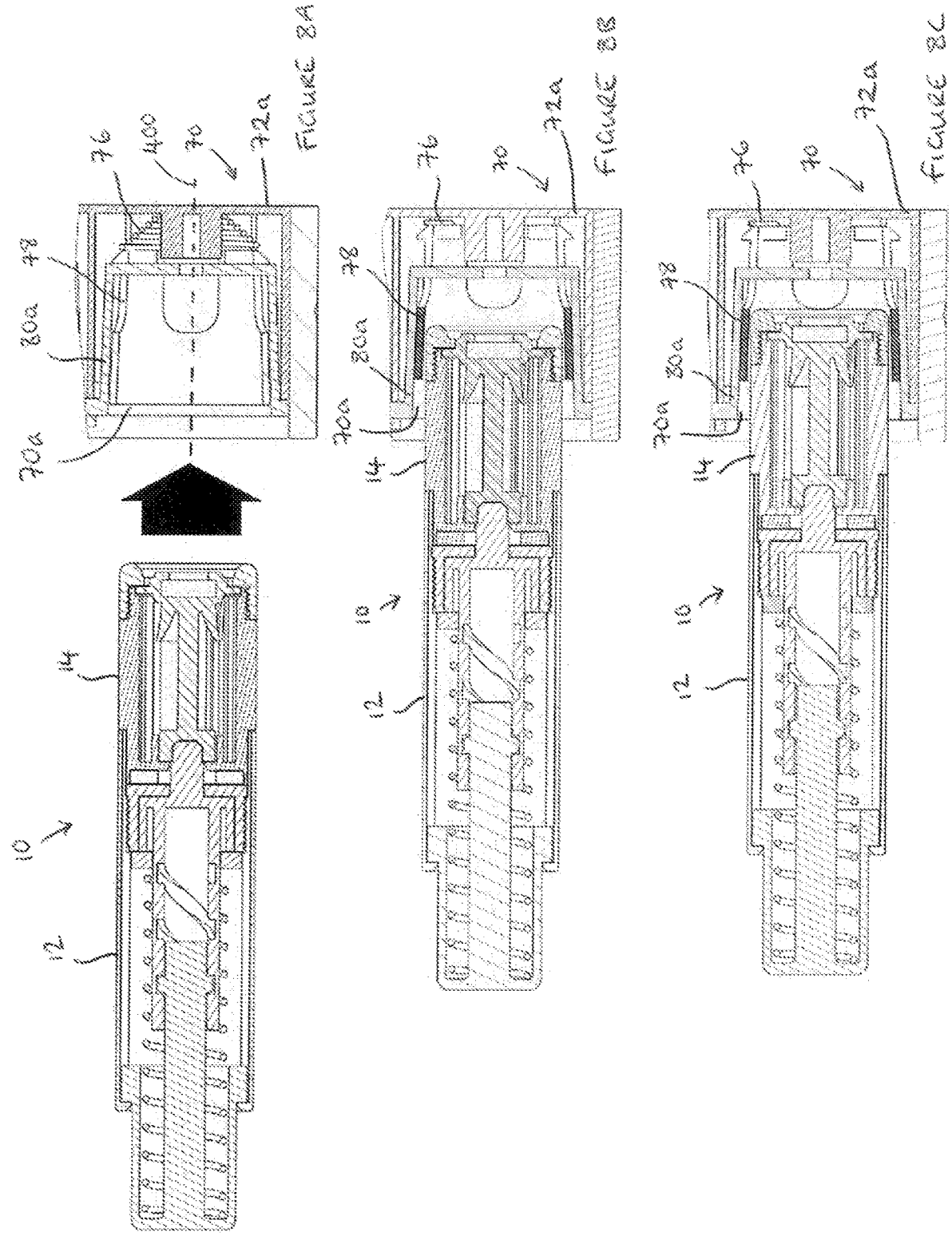

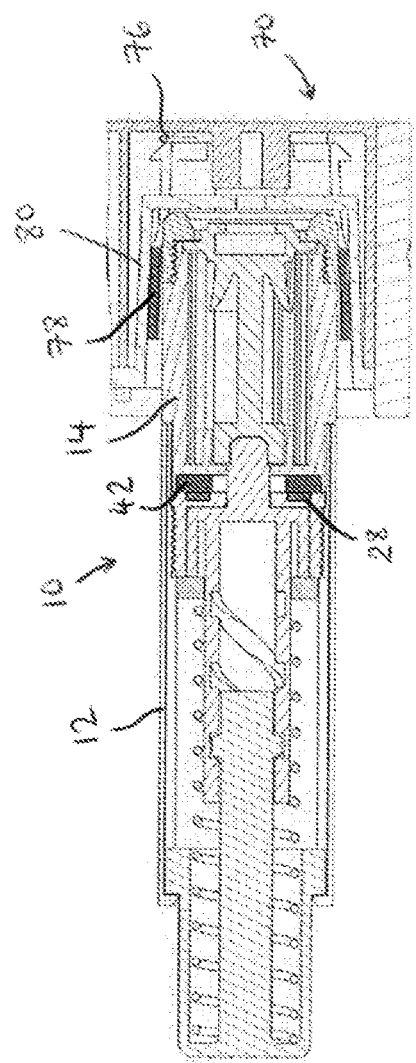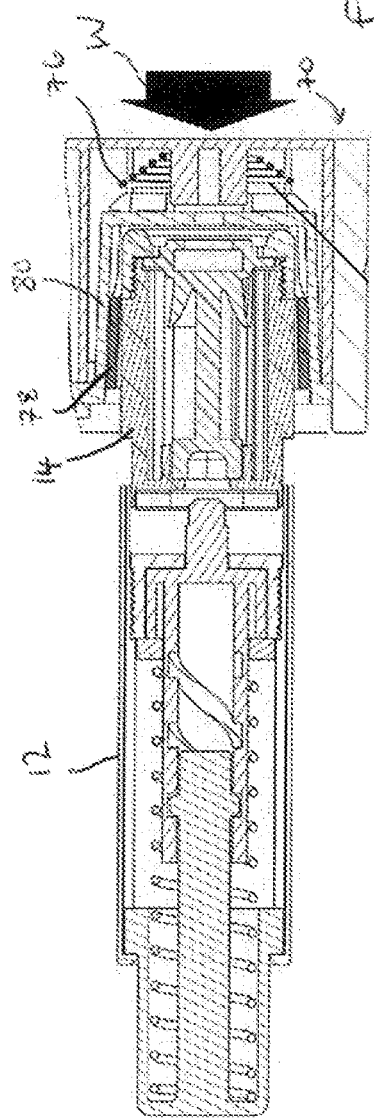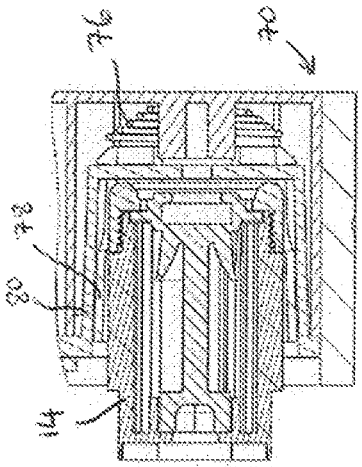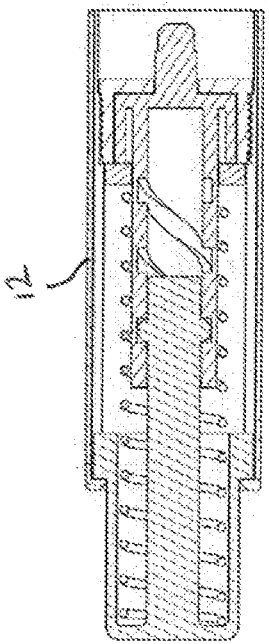
FIGURE 8D
FIGURE 8E
FIGURE 8F

2

MODULAR FOOD DISPENSING DEVICE

This application is a 371 filing of International Patent Application PCT/EP2017/058184 filed 6 Apr. 2017, which claims the benefit of U.S. provisional patent application 62/319,576, filed 7 Apr. 2016, and EP patent application 1606903.1, filed 20 Apr. 2016, the contents of which are hereby incorporated by reference in their entirety.

The present invention relates to a food dispensing device. In particular embodiments, the food dispensing device is modular and includes a drive module that is releasably connectable to a food container.

BACKGROUND

Devices for grinding food products are known. A common example of which is a pepper mill. Such arrangements are used for the dispensing of a variety of food products such as spices and flavourings.

US-A-2013/0193246 describes a device and method for grinding and reducing spices. The described device includes an electrically powered base that includes an electric motor and control system. Spice containers are releasably couplable to the powered base so that spice may be delivered from the device.

It is an object of certain embodiments of the present invention to provide an improved food dispensing device.

It is an object of certain embodiments of the present invention to provide a modular food dispensing device, where the constituent components of the modular food dispensing device may conveniently and effectively be releasably connected to one another.

BRIEF SUMMARY OF THE DISCLOSURE

According to a first aspect, there is provided a modular food dispensing device comprising:
  a food container configured to contain and dispense a food product;
  a drive module for mechanically driving the food container to dispense the food product; and
  one or more magnets provided on one or both of the food container and drive module for releasably connecting the food container and drive module;
  wherein the drive module is releasably connectable to the food container to selectively form a mechanical linkage for transmitting a driving force from the drive module to the food container to dispense the food product.

In certain embodiments, the mechanical linkage may be arranged to transmit torque from the drive module to the food container.

In certain embodiments, the drive module may comprise a drive shaft that is rotatable and arranged to provide torque to the mechanical linkage. The food container may comprise a slave shaft that is rotatable and arranged to receive torque from the mechanical linkage. The mechanical linkage may further comprise a first rotatable part and a second rotatable part, the first rotatable part being engagable with the second rotatable part such that rotation of the first rotatable part causes rotation of the second rotational part. One of the first and second rotatable parts may comprise radial projections and the other of the first and second rotatable parts comprise recesses that are configured to mate with the radial projections. The radial projections may comprise splines and the recesses comprising grooves that are configured to mate with the splines. The first rotatable part may form part of or be connected to the drive shaft, and the second rotatable part forms part of or is connected to the slave shaft.

In certain embodiments, the drive module may comprise an axial drive member that is axially moveable to cause rotation of the drive shaft. The axial drive member may comprise a plunger arranged in or on the drive module. The drive shaft may include a helical channel configured to receive at least a portion of the plunger such that engagement of the portion of the plunger in the helical channel causes rotation of the drive shaft when the plunger moves axially. The at least a portion of the plunger that is receivable in the helical channel may comprise a radial projection. The axial drive member may be moveable between a first axial position and a second axial position that is axially forwards of the first axial position, and the drive module includes a biasing means arranged to axially bias the axial drive member to the first axial position. The biasing means may comprise a spring.

In certain embodiments, the food container may include a food processing means arranged to break down and dispense a food product contained in the food container. The food processing means may be drivable by the slave shaft of the food container and may form part of the slave shaft. Additionally the food processing means may comprise grinding means arranged to grind the food product.

In certain embodiments, the modular food dispensing device may further comprise a food product contained in the food container. The food product may comprise a plurality of food particles which may be substantially spherical.

In certain embodiments, the food container may comprise one or more dispensing apertures that are sized to permit ground food product to be dispensed from the food container but prevent unground food product from being dispensed from the food container.

In certain embodiments, both of the food container and the drive module may include one or more magnets.

In certain embodiments, one of the food container and the drive module may include one or more magnets, and the other of the food container and the drive module includes a magnetisable material that is magnetically attracted to the one or more magnets.

According to a second aspect, there is provided an assembly comprising:
  a modular food dispensing device according to the first aspect; and
  a retainer for retaining the food container when not connected to the drive module.

In certain embodiments, the retainer may be moveable between a first configuration and a second configuration wherein in the first configuration the food container is retained in the retainer by a first retaining force that is greater than a magnetic force provided by the one or more magnets, and in the second configuration the food container is retained in the retainer by a second retaining force that is less than the magnetic force such that the magnetic force may be sufficient to release the food container from the retainer. The retainer may comprise a moveable carriage that is moveable between a first position in the first configuration and a second position in the second configuration. The carriage may provide the first and second retaining forces. The retainer may further comprise biasing means for biasing the carriage towards the second position, wherein the biasing means may comprise a spring. One or both of the first and second retaining forces may be frictional forces for acting between the retainer and the food container.

In certain embodiments, the retainer may be configured to releasably retain a plurality of food containers.

According to a third aspect, there is provided a food dispensing device comprising:

a food container configured to contain a food product; and a drive assembly having a drive shaft configured to cause the food product to be dispensed from the food container, and an axial drive member that is axially moveable to cause rotation of the drive shaft.

In certain embodiments, the axial drive member may comprise a plunger arranged in or on the drive assembly.

In certain embodiments, the drive shaft may include a helical channel configured to receive at least a portion of the plunger such that engagement of the portion of the plunger in the helical channel causes rotation of the drive shaft when the plunger moves axially. The at least a portion of the plunger that is receivable in the helical channel may comprise a radial projection.

In certain embodiments, the axial drive member may be moveable between a first axial position and a second axial position that is axially forwards of the first axial position, and the drive assembly includes a biasing means arranged to axially bias the axial drive member to the first axial position. The biasing means may comprise a spring.

In certain embodiments, the food container may include a food processing means arranged to break down and dispense a food product contained in the food container. The food processing means may comprise grinding means arranged to grind the food product.

In certain embodiments, the food dispensing device may further comprise a food product contained in the food container. The food product may comprise a plurality of food particles which may be substantially spherical.

In certain embodiments, the food container may comprise one or more dispensing apertures that are sized to permit ground food product to be dispensed from the food container but prevent unground food product from being dispensed from the food container.

In certain embodiments, the drive assembly may be releasably connectable to the food container to selectively form a mechanical linkage for transmitting a driving force from the drive assembly to the food container to dispense the food product. The mechanical linkage may be arranged to transmit torque from the drive module to the food container. The drive module may comprise a drive shaft that is rotatable and arranged to provide torque to the mechanical linkage. The food container may comprise a slave shaft that is rotatable and arranged to receive torque from the mechanical linkage. The mechanical linkage may further comprise a first rotatable part and a second rotatable part, the first rotatable part being engagable with the second rotatable part such that rotation of the first rotatable part causes rotation of the second rotational part. One of the first and second rotatable parts may comprise radial projections and the other of the first and second rotatable parts comprises recesses that are configured to mate with the radial projections. The radial projections may comprise splines and the recesses comprising grooves that are configured to mate with the splines. The first rotatable part may form part of or be connected to the drive shaft, and the second rotatable part forms part of or is connected to the slave shaft. The food dispensing device may comprise one or more magnets provided on one or both of the food container and drive assembly for releasably connecting the food container and drive assembly. Both of the food container and the drive assemble may include one or more magnets, or, one of the food container and the drive assembly may include one or more magnets and the other of the food container and the drive assembly includes a magnetisable material that is magnetically attracted to the one or more magnets.

According to a fourth aspect, there is provided an assembly comprising:

a food dispensing device according to the above embodiment; and a retainer for retaining the food container when not connected to the drive assembly.

In certain embodiments, the retainer may be moveable between a first configuration and a second configuration, wherein in the first configuration the food container is retained in the retainer by a first retaining force that is greater than a magnetic force provided by the one or more magnets, and in the second configuration the food container is retained in the retainer by a second retaining force that is less than the magnetic force such that the magnetic force may be sufficient to release the food container from the retainer. The retainer may comprise a moveable carriage that is moveable between a first position in the first configuration and a second position in the second configuration. The carriage may provide the first and second retaining forces. The retainer may comprise biasing means for biasing the carriage towards the second position, wherein the biasing means may comprise a spring. One or both of the first and second retaining forces may be frictional forces for acting between the retainer and the food container.

In certain embodiments, the retainer may be configured to releasably retain a plurality of food containers.

BRIEF DESCRIPTION OF THE DRAWINGS

Embodiments are further described hereinafter with reference to the accompanying drawings, in which:

FIG. 1 shows a modular food dispensing device in accordance with an embodiment of the present invention;

FIG. 4 is a cross-sectional view of the food dispensing device of FIG. 1;

FIG. 5 is a cross-sectional view of the food dispensing device of FIG. 1 in a use configuration;

FIG. 7A shows a stand retaining the drive module and the rack;

FIG. 7B shows the stand of FIG. 7A during attachment of the drive module to one of the food containers;

FIG. 7C shows the stand of FIGS. 7A and 7B after removal of one of the food containers by the drive module; and FIGS. 8A to 8F show, in cross section, the various stages of the replacement of a food container in the rack.

DETAILED DESCRIPTION

A modular food dispensing device 10 in accordance with an embodiment of the present invention is shown in FIG. 1. The modular food dispensing device 10 includes a food container 14 that is configured to contain and dispense a food product, and a drive module 12 that is configured to drive the food container 14 to dispense the food product therefrom. FIG. 1 shows the food dispensing device 10 in a non-connected configuration, i.e. in which the drive module 12 is not connected to the food container 14.

Figure 2:
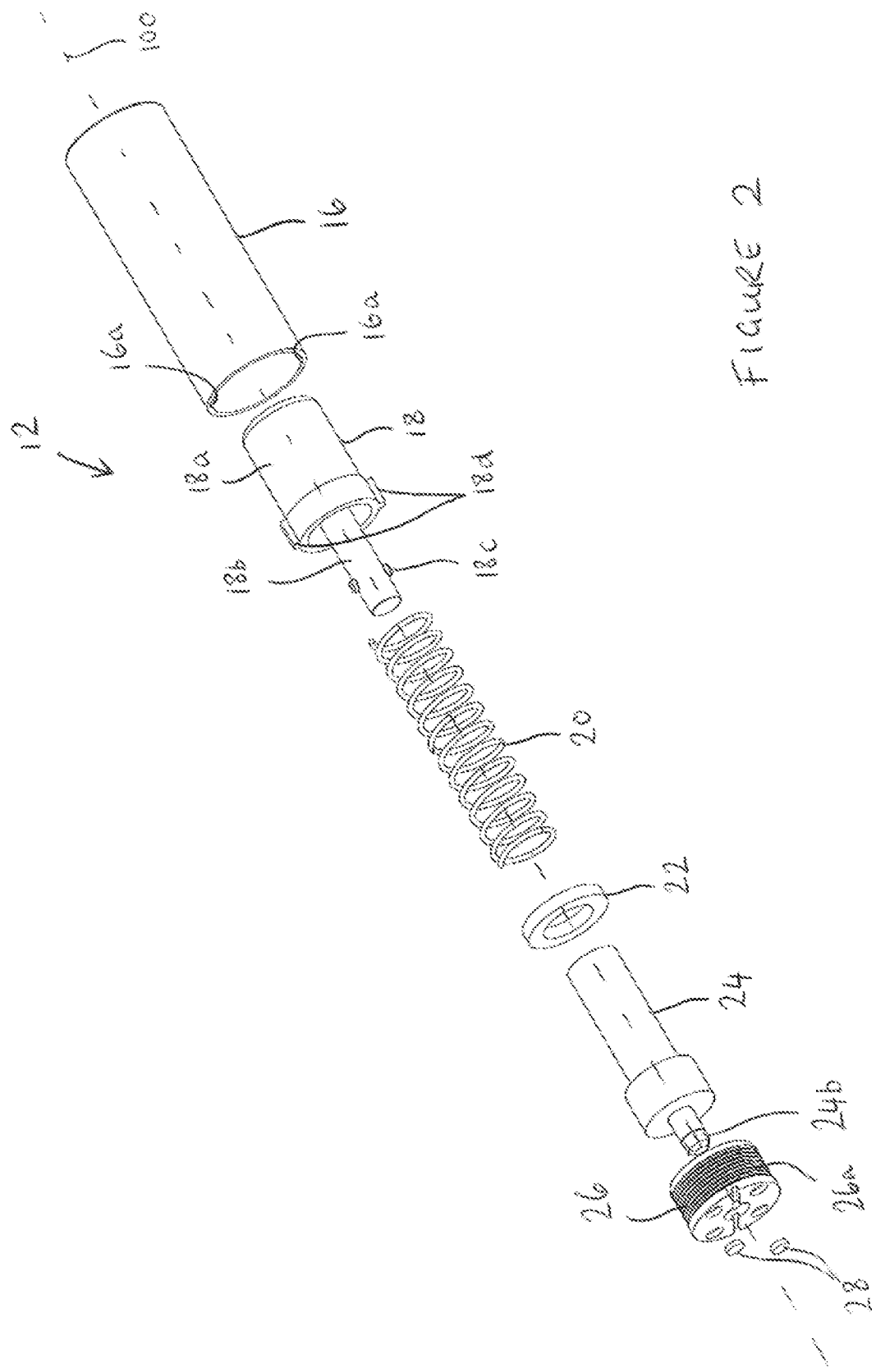
FIG. 2 is an exploded view of the drive module of the food dispensing device of FIG. 1.

FIG. 2 shows an exploded detailed view of the drive module 12. The drive module 12 extends generally along a longitudinal axis 100. The drive module 12 has a main body 16 in which is received a plunger 18 that is axially moveable relative to the main body 16 (i.e. moveable in a direction parallel to the longitudinal axis 100). The plunger 18 includes a plunger body 18a and a plunger rod 18b extending axially from the plunger body 18a. The plunger rod 18b includes a plurality of drive tabs 18c extending radially outwardly therefrom. In a similar manner, the plunger body 18a includes a plurality of alignment tabs 18d extending radially outwardly therefrom. When the drive module 12 is assembled, the alignment tabs 18d reside within alignment grooves 16a on an inner surface of the main body 16 where the alignment grooves 16a are configured to only permit axial movement of the alignment tabs 18d therein, and therefore only permit axial movement of the plunger 18 relative to the main body 16. That is, engagement between the alignment tabs 18d and alignment grooves 16a limits or inhibits any rotational movement of the plunger 18 relative to the main body 16 about the longitudinal axis 100.

The drive module 12 additionally includes a drive shaft 24 and a retaining boss 26 arranged such that the drive shaft 24 is capable of rotating about longitudinal axis 100 partially within and relative to the retaining boss 26. In use, the retaining boss 26 remains axially and rotatably stationary within the main body 16. In the embodiment shown in the Figures, the retaining boss 26 has an outer screw thread 26a that is screwable into a screw thread (not shown) on an inner surface of the main body 16. The plunger 18 is biased by biasing means away from the drive shaft 24. In particular, the plunger 18 is axially moveable relative to the drive shaft 24 between a first axial position and a second axial position that is axially forwards of the first axial position, and the biasing means biases the plunger 18 towards the first axial position. In the embodiment shown in the Figures, the biasing means comprises a spring 20. In the non-limiting embodiment shown in the Figures, a spring washer 22 is additionally provided to provide a reaction surface against which the spring 20 may act. In alternative embodiments, other biasing members or mechanisms may provide the biasing means.

When the device 10 is assembled (i.e. when the drive module 12 is connected to the food container 14), the plunger rod 18b extends into a bore of the drive shaft 24. The bore of the drive shaft 24 includes a helical channel 24a (shown in FIG. 4) that receives one or more of the drive tabs 18c. In moving between the first axial position and the second axial position, the plunger 18, by virtue of engagement between the drive tabs 18c and the helical channel 24a, causes the drive shaft 24 to rotate about the longitudinal axis 100. In other embodiments, any suitable radial projection that is at least partially received in the helical channel 24a may be utilized in place of the drive tabs 18c. If the axial force moving the plunger 18 axially forwardly of the first axial position is removed, the spring 20 causes the plunger 18 to return to the first axial position. In doing so, the drive shaft 24 is caused to rotate about the longitudinal axis 100 (in the opposite direction) due to engagement between the drive tabs 18b and the helical channel 24a. In alternative embodiments, any suitable axial drive member may be moved axially to cause rotation of the drive shaft 24, in place of the plunger 18 described herein.

The drive module 12 additionally includes a plurality of permanent magnets 28, the purpose of which is described in further detail below. In the non-limiting embodiment shown in the Figures, the permanent magnets 28 are provided in the recesses within the retaining boss. In other embodiments, the permanent magnets 28 (if present) may be provided elsewhere.

Figure 3:
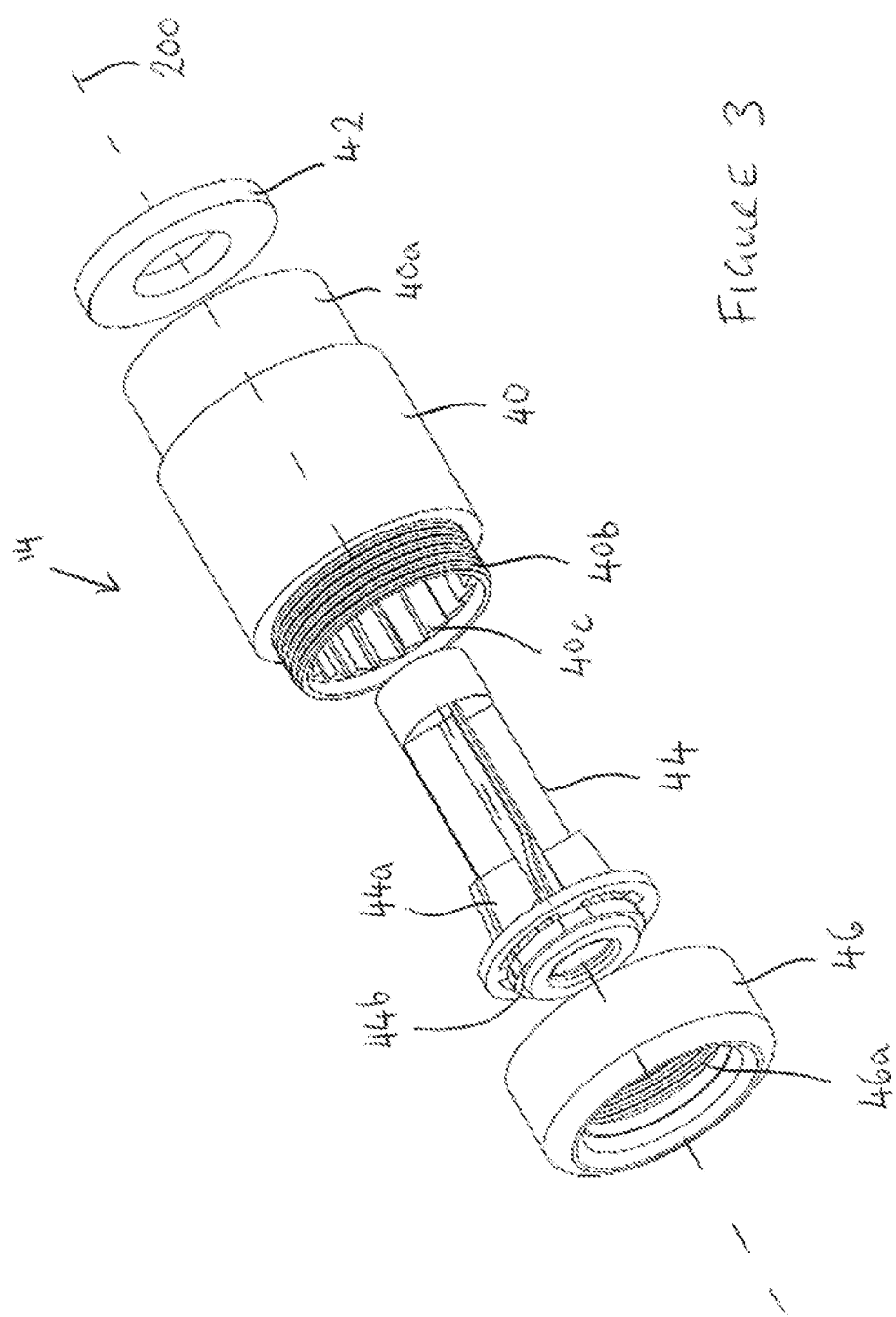
FIG. 3 is an exploded view of the food container of the food dispensing device of FIG. 1.

FIG. 3 shows an exploded detailed view of the food container 14. The food container 14 extends along a longitudinal axis 200 and includes a body 40, a slave shaft 44 and a cap 46 for retaining the slave shaft 44 within the body 40. In the embodiment shown in the Figures, the cap 46 is received on the body 40 by engagement of complementary screw threads 46a, 40b. In other embodiments, other fixing mechanisms may be employed to connect the cap 46 to the body 40.

The food container 14 additionally includes a magnetisable material in the form of an attraction plate 42 that is magnetically attracted to the permanent magnets 28. As a result, the drive module 12 may be releasably connectable to the food container 14 by virtue of the magnetic attraction between the permanent magnets 28 and the attraction plate 42. In alternative embodiments, the magentisable material may be provided in forms other than an attraction plate 42. In certain embodiments, the permanent magnets 28 (of which there may be any number, including one) may form part of the food container 14 and the magnetisable material may form part of the drive module 12. In certain embodiments, magnetic attraction between two permanent magnets (i.e. at least one permanent magnet on each of the drive module 12 and food container 14) may provide the releasable connection between the drive module 12 and food container 14. As shown in the Figures, a portion of the food container 14 may be received within a portion of the drive module 12 when connected thereto so as to provide further mechanical security around the magnetic connection therebetween. Of course, in other embodiments, a portion of the drive module 12 may be receivable within a portion of the food container 14, or neither of the food container 14 or drive module 12 may be receivable in the other.

The slave shaft 44 is rotatable within the body 40 about longitudinal axis 200. The slave shaft 44 includes a plurality of radially extending paddles 44a at an axially forward end, and a plurality of apertures axially forwards of the paddles 44a. An inner surface of the body 40 includes a series of axially extending ridges 40c, the purpose of which is described below.

The food container 14 is configured to contain and dispense a food product. For example, the body 40 may contain a food product that is disposed around the slave shaft 44. The food product may be in the form of particles such as spheres, blocks or other regular or irregular shapes. In other embodiments, the food product may be in other forms. Rotation of the slave shaft 44 about the longitudinal axis 200 may cause the food product to be urged against the ridges 40c by the rotating paddles 44a and break up into smaller pieces. Pieces that are small enough to pass through the apertures 44b may then pass through the apertures 44b (e.g. under the influence of gravity) and be dispensed from the device 10.

When the drive module 12 is connected to the food container 14 (as shown in FIG. 4), the drive shaft 24 forms a mechanical linkage with the slave shaft 44 such that a driving force may be transmitted from the drive module 12 to the food container 14. In particular, the mechanical linkage permits the transmission of torque from the drive module 12 to the food container 14 and, specifically, from the drive shaft 24 to the slave shaft 44. In the embodiment shown in the Figures, torque is transferred from the drive shaft 24 to the slave shaft 44 via engagement between a male end 24b of the drive shaft 24 and a female socket 44c of the slave shaft 44. The engagement may be a splined engagement. Alternatively, the male end 24b may have a hexagonal or other polygonal cross section and the female socket 44c may have a complementary shape such that rotation of the drive shaft 24 causes rotation of the slave shaft 44. In alternative embodiments, the drive shaft 24 may have the female socket and the slave shaft 44 may have the male end that is received in the female socket. In other embodiments, the drive shaft 24 and/or slave shaft may be connected to a further one or more components that is/are capable of transmitting torque from the drive shaft 24 to the slave shaft 44. The mechanical linkage formed between the drive module 12 and food container 14 may include any two or more rotatable parts that are engageable with one another such that rotation of one of the rotatable parts causes rotation of another of the rotatable parts. The engagement between the rotatable parts may include engagement between radial projections (e.g. splines) and recesses (e.g. grooves) that are configured to mate with the radial projections.

FIGS. 4 and 5 show the food dispensing device 10 in an assembled configuration in which the drive module 12 is connected to the food container 14. As shown in FIG. 5, the drive module 12 and food container 14 share a common longitudinal axis 300 when connected to one another. FIG. 4 shows the device 10 in a pre-use condition where a food product 48 in the form of spherical particles is contained in the food container 14 around the slave shaft 44. When the user wishes to dispense food product 48 from the device 10, a force F (indicated in FIG. 5) is applied to move the plunger 18 axially forwardly relative to the main body 16 of the drive module 12. As described above, axial movement of the plunger 18 causes rotation (indicated by arrow R1 in FIG. 5) of the drive shaft 24 due to engagement between the drive tabs 18c and the helical channel 24a. The rotation of the drive shaft 24 causes rotation of the slave shaft 44 (as indicated by arrow R2 in FIG. 5) due to the engagement therebetween, as described above. The rotation of the slave shaft 44 causes the food product 48 to be broken into smaller pieces 48a by the mechanical action of the paddles 44a and ridges 40c, and the smaller pieces 48a are then able to pass through the apertures 44b in the slave shaft 44 and be dispensed from the device 10. Removal of force F permits the plunger 18 to move axially rearwardly under the influence of the spring 20 to return the device to the configuration shown in FIG. 4.

In alternative embodiments, the food product 48 may be broken into smaller pieces 48a by means other than the paddles 44a and ridges 40c. Indeed, any suitable mechanism (e.g. which may be rotatably driven) may be employed. In other embodiments, the food container 14 may include means to process a food product in other ways than that described above. For example, the food container 14 may include one or more mechanisms for grinding, milling, reducing, sifting, crushing, breaking, and/or slicing the food product.

Figure 6:
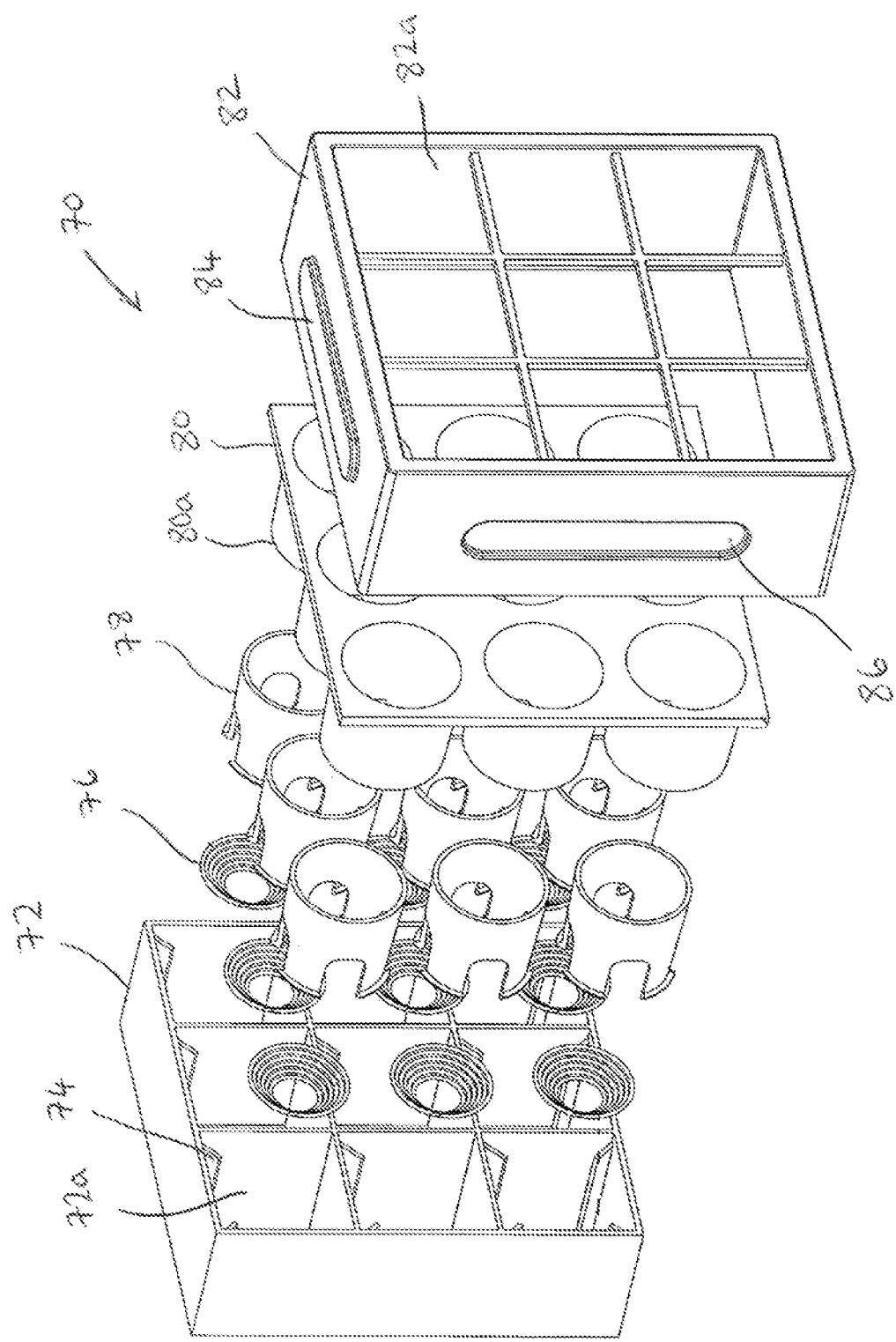
FIG. 6 is an exploded view of a rack for releasably retaining one or more food containers in accordance with an embodiment of the present invention.

FIG. 6 shows an exploded view of a rack 70 in accordance with an embodiment of the present invention. The rack 70 serves as a retainer for retaining one or more food containers 14 when the food containers 14 are not connected to the drive module 12. In this manner, the rack 70 may retain a plurality of food containers 14, where each food container 14 may contain a different food product (e.g. a different spice or flavour).

The rack 70 includes a rear housing 72 that defines individual rear housing units 72a. Each rear housing unit 72a contains a capture spring 76 and a capture housing 78. A front housing 80 defines individual front housing units 80a which are each received in the rear housing units 72a. An outer housing 82 fits over the rear housing 72 and provides the rack 70 with an aesthetic cover. The outer housing 82 defines individual outer housing units 82a which are formed as apertures that permit access to the components contained in the rear housing units 72a. In the embodiment shown in FIG. 6, the outer housing 82 includes a rib 84 that protrudes from one of its sides, and further includes a groove 86 on another of its sides. An additional rib 84 and groove 86 may be present on the two non-visible sides of the rack 70 of FIG. 6. The arrangement of ribs 84 and grooves 86 may be otherwise provided on the outer housing 82 in alternative embodiments. The ribs 84 and grooves 86 may permit the interlocking connection of multiple racks 70 where a rib 84 of one rack 70 is received in a complementary groove 86 of another rack 70. Other interlocking features may be used in alternative embodiments to permit the assembly of multiple racks 70 with one another.

The operation of the rack 70 is described in further detail below with reference to FIGS. 7A to 7C and 8A to 8F.

FIGS. 7A to 7C show several stages of operation of the rack 70. In the arrangement shown in FIGS. 7A to 7B the rack 70 is disposed on a stand 88 that also serves to receive the drive module 12 when not in use. In one embodiment, the stand 88 may include a rib or groove that may engage with a complementary rib 84 or groove 86 of the rack 70 to retain the rack 70 on the stand 88. In FIG. 7A, the drive module 12 and the rack 70 are disposed on the stand 88, with the rack 70 containing a plurality of food containers 14. FIG. 7B shows the drive module 12 removed from the stand 88 and in the process of connecting with one of the food containers 14 retained by the rack 70. FIG. 7C shows the drive module 12 and one of the food containers 14 connected to one another, where the connected food container 14 has been withdrawn from the rack 70 by the drive module 12.

FIGS. 8A to 8F show, in cross section, various stages of the replacement of a food 14 container in the rack 70 using the drive module 12. In each of FIGS. 8A to 8F, a portion of the rack 70 that includes a single rack unit 70a (for containing a single food container 14) is shown.

FIG. 8A shows the food dispensing device 10 with the drive module 12 connected to the food container 14. The rack unit 70a shown in FIG. 8A is initially empty and is suitable for receiving the food container 14. In the empty rack unit 70a, the capture housing 78 sits inside (i.e. radially inwards of) the front housing unit 80a. The front housing unit 80a remains stationary in the rack 70 and the capture housing 78 acts as a moveable carriage, being moveable relative to the front housing unit 80a along a longitudinal axis 400 of the rack unit 70a. In particular, the capture housing 78 is axially moveable along longitudinal axis 400 against the capture spring 76 which acts as a biasing means. As such, the capture housing 78 may move axially from a first axial position in which the capture spring 76 is not compressed, to a second axial position in which the capture spring 76 is at least partially compressed. The (at least partially) compressed capture spring 76 acts on the capture housing 78 to bias the capture housing 78 back to the first axial position. In alternative embodiments, other biasing members or mechanisms may provide the biasing means in place of the capture spring 76 described herein.

FIG. 8B shows the food dispensing device 10 being partially inserted into the rack unit 70a such that the food container 14 is received therein. The insertion of the food container 14 into the rack unit causes the food container 14 to contact the capture housing 78 and, by frictional engagement, cause axial movement of the capture housing 78 along longitudinal axis 400 whilst compressing the capture spring 76. The front housing unit 80a has a tapered profile such that its diameter decreases in a direction parallel to the longitudinal axis. Additionally, the capture housing 78 is configured to flex radially. Such radial flexibility may be afforded by the presence of axial slots in the capture housing 78, where the axial slots define radially flexible fingers or panels. In other embodiments, the radial flexibility of the capture housing 78 may be afforded by other means including the configuration and/or material of the capture housing 78. As a consequence of the tapered profile of the front housing unit 80a and the radial flexibility of the capture housing 78, the capture housing 78 is caused to flex radially inwardly as it moves axially into the rack unit 70a. As such, the frictional engagement between the capture housing 78 and the food container 14 increases. The further the food container 14 moves axially into the rack unit 70a, the greater the engagement between the capture housing 78 and the food container 14. Once the capture spring 76 is fully compressed and the capture housing 78 is unable to move axially further into the rack unit 70a, the food container 14 may be advanced axially further into the rack unit 70a by moving axially relative to the substantially stationary capture housing 78. FIG. 8C shows the food container 14 in a more advanced axial position in the rack unit 70a relative to the configuration shown in FIG. 8B, and FIG. 8D shows the food container 14 in a more advanced axial position in the rack unit 70a relative to the configuration shown in FIG. 8C. The capture housing 78 is in the same ("second") axial position in each of FIGS. 8B, 8C and 8D.

In the configuration shown in FIG. 8D, the food container 14 is fully inserted into the rack unit 70a and cannot travel any further into the rack unit 70a due to abutment with the front housing unit 80a. In the configuration shown in FIG. 8D, the frictional forces between the capture housing 78 and the food container 14 provide a first retaining force that is greater than the magnetic forces holding the drive module 12 and food container 14 together. As such, a force applied by the user to the drive module 12 in the direction of arrow W shown in FIG. 8E causes the drive module 12 to detach from the food container 14, leaving the food container 14 retained in the rack unit 70a. With axial forces no longer being applied to the food container 14 by the user, the capture housing 78 is free to move from the second axial position to the first axial position under the influence of the capture spring 76. In the first axial position, the capture housing 78 remains capable of retaining the food container 14 within the rack unit 70a as shown in FIG. 8F. However, the frictional forces (providing a "second retaining force") that retain the food container 14 within the rack unit 70a are less than the magnetic forces that may connect the drive module 12 to the food container 14. As such, the drive module 12 may, at a later time, be brought into proximity with the food container 14 to permit the magnetic connection to be established so that the food container 14 may be removed from the rack unit 70a as part of the fully assembled food dispensing device 10. In this manner, a single drive module 12 may easily be selectively connectable to a plurality of food containers 14 which may each contain a different food product. When the food containers 14 are not required, they may each be retained in a rack unit 70a of the rack 70. Similarly, when the drive module 12 is not in use, it may be stored on the stand 88.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example provided herein are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A modular food dispensing device comprising:
a food container configured to contain and dispense a food product;
a drive module for mechanically driving the food container to dispense the food product; and
one or more magnets provided on one or both of the food container and drive module for releasably connecting the food container and drive module;
wherein the drive module is releasably connectable to the food container to selectively form a mechanical linkage for transmitting a driving force from the drive module to the food container to dispense the food product; and
wherein the drive module further comprises a drive shaft that is rotatable and arranged to provide torque to the mechanical linkage and an axial drive member that comprises a plunger arranged in or on the drive module.

2. The modular food dispensing device of claim 1, wherein the mechanical linkage is arranged to transmit torque from the drive module to the food container.

3. The modular food dispensing device of claim 1, wherein the food container comprises a slave shaft that is rotatable and arranged to receive torque from the mechanical linkage.

4. The modular food dispensing device of claim 3, wherein the mechanical linkage comprises a first rotatable part and a second rotatable part, the first rotatable part being engagable with the second rotatable part such that rotation of the first rotatable part causes rotation of the second rotational part.

5. The modular food dispensing device of claim 4, wherein one of the first and second rotatable parts comprises radial projections and the other of the first and second rotatable parts comprises recesses that are configured to mate with the radial projections.

6. The modular food dispensing device of claim 5, wherein the radial projections comprise splines and the recesses comprise grooves that are configured to mate with the splines.

7. The module food dispensing device of claim 4, wherein the first rotatable part forms part of or is connected to the drive shaft, and the second rotatable part forms part of or is connected to the slave shaft.

8. The modular food dispensing device of claim 1, wherein the axial drive member is axially movable to cause rotation of the drive shaft.

9. The modular food dispensing device of claim 8, wherein the axial drive member comprises a plunger arranged in or on the drive module.

10. The modular food dispensing device of claim 8, wherein the drive shaft includes a helical channel configured to receive at least a portion of the plunger such that engagement of the portion of the plunger in the helical channel causes rotation of the drive shaft when the plunger moves axially.

11. The modular food dispensing device of claim 10, wherein the at least a portion of the plunger that is receivable in the helical channel comprises a radial projection.

12. The modular food dispensing device of claim 8, wherein the axial drive member is moveable between a first axial position and a second axial position that is axially forwards of the first axial position, and the drive module includes a biasing means arranged to axially bias the axial drive member to the first axial position.

13. The modular food dispensing device of claim 12, wherein the biasing means comprises a spring.

14. The modular food dispensing device of claim 1, wherein the food container includes a food processing means arranged to break down and dispense a food product contained in the food container.

* * * * *